United States Patent [19]

Fang et al.

[11] Patent Number: 5,128,552
[45] Date of Patent: Jul. 7, 1992

[54] SYSTEM AND METHOD FOR POWER SUPPLY PRESERVATION IN A PERSONAL HEALTH MONITOR

[75] Inventors: William Fang, Naperville; Charles Qian, Prospect Heights, both of Ill.

[73] Assignee: Buddy Systems, Inc., Northbrook, Ill.

[21] Appl. No.: 461,267

[22] Filed: Jan. 5, 1990

[30] Foreign Application Priority Data

Sep. 29, 1989 [CA] Canada .................................. 614852

[51] Int. Cl.⁵ ................................................ H02J 9/06
[52] U.S. Cl. ...................................... 307/66; 307/64; 364/413.02
[58] Field of Search ................... 340/636; 307/64, 66, 307/85, 86, 87; 364/413.02, 413.03, 413.06

[56] References Cited

U.S. PATENT DOCUMENTS 4,508,974  4/1985  Henderson ............................ 307/66
4,677,311  6/1987  Morita ................................... 307/66
4,728,808  3/1988  Bet-Esh et al. ....................... 307/66

Primary Examiner—Jeffrey A. Gaffin
Attorney, Agent, or Firm—Willian Brinks Olds Hofer Gilson & Lione

[57] ABSTRACT

A method and system for providing a reliable power supply for a personal health monitor that operates on power provided by a first power source or a second power source and that includes an isolation relay that disconnects the personal health monitor from the first power source in the absence of a supply of power. A controller provides that the personal health monitor is started from the second power source and thereafter connected to the first power source and operated for a first set of one or more activities, disconnected from the first power source and operated from the second power source for a second set of one or more activities, and, upon the condition of a disruption of the first power source, one or more components of the personal health monitor are disconnected from the second power source, and the isolation relay is supported by the second power source to enable the personal health monitor to be restarted from the first power source.

22 Claims, 3 Drawing Sheets

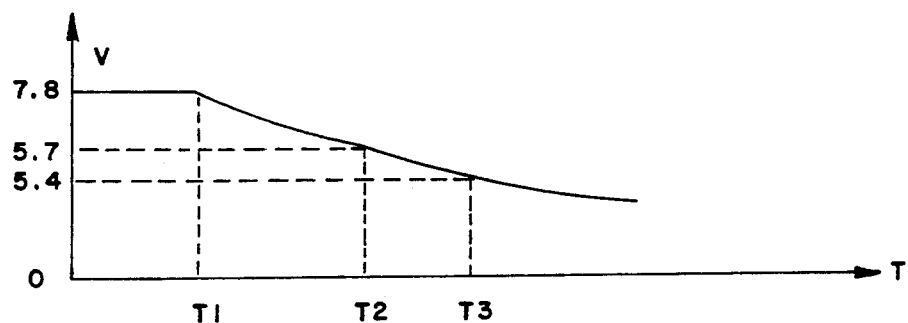
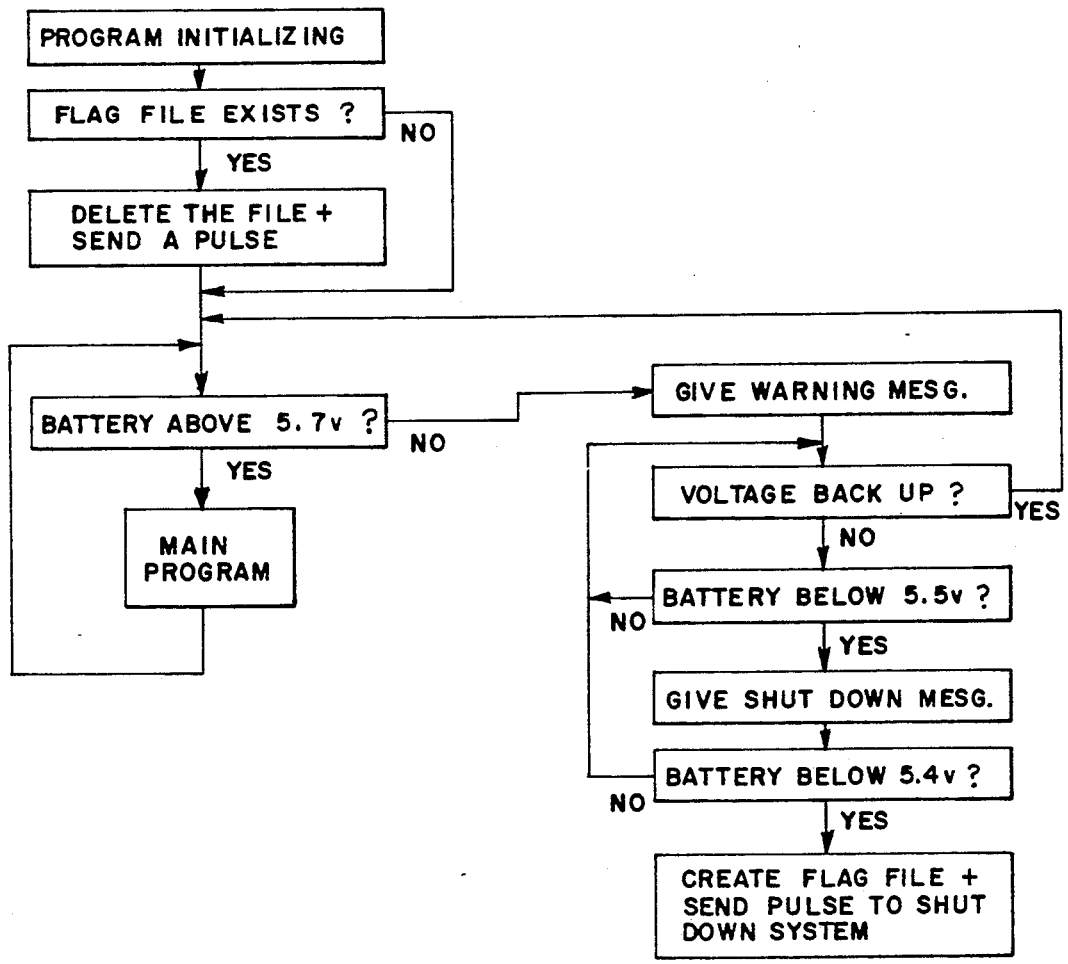

SYSTEM AND METHOD FOR POWER SUPPLY PRESERVATION IN A PERSONAL HEALTH MONITOR

BACKGROUND OF THE INVENTION

This invention relates to personal health monitors and more particularly to improvements for a personal health monitor to sustain reliable operation.

A personal health monitor is a device used to measure and record one or more clinical parameters of a patient for later review by the patient's physician or other health care provider. The personal health monitor may be used in a hospital or clinical setting as an adjunct to existing care. However, the personal health monitor may also be used by the patient in his own home. When used by a patient in his own home, the patient operates the personal health monitor to record certain of his own clinical parameters. The personal health monitor, therefore, may be used by the patient who has a condition requiring monitoring of one or more clinical parameters but who otherwise does not require the level of care such as provided by a hospital. In such a circumstance, the personal health monitor provides potential savings in medical costs involved with a hospital stay. A personal health monitor of the type considered herein is described more fully in U.S. Pat. No. 4,803,625.

The personal health monitor may include one or more test components, or sensors, a programmable computer such a general purpose personal computer, and an interface connecting the sensors with the personal computer. In the above referenced patent, the programmable computer is a laptop personal computer having a display screen, a keyboard, CPU (central processing unit), disk drive, and a means for connecting to the interface such as through a port, expansion slot, bus, or other means.

A program on the computer affords an interative, user-friendly way for the patient to interact with the personal health monitor to measure one or more clinical parameters. For purposes of this application, clinical parameters include physiological parameters, (such as vital signs like ECG, blood pressure, temperature, and weight), medication compliance and volunteered patient replies. The program can be specifically tailored to the patient's individual needs.

With the sensors a patient can measure one or more specific physiological parameters. The interface connects to the sensors and converts the signals from the sensors for storage as data by the personal computer.

In accordance with the testing regime established by the patient's physician, the personal health monitor may be used on a specific schedule to conduct sessions to measure certain of the patient's clinical parameters following instructions provided by the personal health monitor. In the embodiment described in the above referenced patent, the personal health monitor includes a personal computer with a display screen portion that can provide instructions for conducting a session in which clinical parameters are determined. For example, the program on the personal computer can provide instructions for measuring a patient's blood pressure or ECG. In addition, the personal health monitor can also present the patient with a series of questions about his health and prompt the patient for responses. For example, the patient can be asked to volunteer replies in response to a structured series of questions (e.g., "Do you have a fever?" followed by "If so, is your fever continuous or intermittent?"). The personal health monitor can be programmed to sound a reminder to initiate a testing session and record whether the patient adheres to the established schedule.

The personal health monitor can be used to give the patient instructions for taking medicines and provide the patient with reminders to take medications. Moreover, the personal health monitor can allow a physician to readily modify a medication schedule. For example, based upon the physiological parameters gathered by the personal health monitor and reviewed by a patient's physician, the physician may decide to alter the medication.

As described in the above referenced patent, the personal health monitor may include means for data storage so that the clinical parameters measured can be stored as data. The personal computer may include a modem so that the data can be transmitted to a central station. The data transmission can be done automatically by a program on the personal computer. An alternative is to convey the data on a diskette or other storage medium to the central station. The physician or other health care provider can then obtain the information from the central station either by calling, downloading or other means of communication. Alternately, a health care provider may be able to access the personal health monitor directly An advantage of the personal health monitor is that a high level of patient surveillance can be provided, even with the patient outside of a hospital or other expensive facility Thus, the personal health monitor has the capability of lowering health care costs while at the same time maintaining or even improving the level of patient surveillance. Additional benefits include being able to return a patient to his home environment sooner and also providing a means for involving the patient in his own health program.

A concern with using a personal health monitor for home use involves providing a safe yet reliable power supply. For example, various sensors such as ECG sensors pose a potential risk of electric shock to a patient while the personal health monitor is directly connected to ordinary house current (also referred to herein as AC). To reduce or avoid the risk of any possible accidents, an isolation circuit is provided The isolation circuit can completely isolate the portion of the personal health monitor unit with which the patient interacts from the house current. The isolation circuit may be of a type, such as an opto-electric relay, that uses optical techniques to open a switch to turn off the supply of house current to the personal health monitor. During these periods, the personal health monitor can be operated from a backup battery. The backup battery may be regularly or continuously recharged by the house current during the periods of time that the isolation circuit is closed and house current is being supplied to the personal health monitor.

The same backup battery can also be used provide power to run the personal health monitor during temporary power outages. The backup battery also allows the patient to disconnect the personal health monitor for short periods of time to move it from one place to another. The battery also provides continued use of the personal health monitor in the event that the personal health monitor is accidentally disconnected from the house current.

In order that the rechargeable backup battery can be used for these purposes, it should be automatic, i.e. it should operate to provide power even in the event that the personal health monitor is unattended. A problem with unattended operation of the rechargeable battery is that with typical rechargeable batteries that are currently available, the personal health monitor will operate for only a limited time. If the personal health monitor is unattended when the AC is disconnected, it is possible that the rechargeable battery may completely run down before the power is restored. The battery may be permanently damaged or not rechargeable. It is also possible that data may be lost or destroyed.

Another concern that may occur with using a rechargeable backup battery involves the isolation circuit. An isolation circuit typically requires power to close or stay closed, i.e. to enable the path by which AC is supplied to the personal health monitor. In the absence of a supply of power, the isolation circuit will open shutting off the path for AC to reach the personal health monitor. This can be avoided by using a battery backup power supply. However, if the backup battery also runs down, there would be no power to keep the isolation circuit closed. Thus the isolation circuit would open. Then even if the AC is restored, the isolation circuit would be open and would prevent the AC from reaching the personal health monitor.

Still another problem with using an rechargeable backup battery involves initialization. For example, it can be very important for the operation of the personal health monitor to distinguish between a condition when AC is initially supplied to the unit (for example, when it is first turned on or installed) and the condition when AC is restored to the unit after it has been disconnected for some amount of time. When the personal health monitor is first set up for use by the patient, a service person, such as a nurse, will turn the unit ON and connect it to AC (house current). During this initial installation, the personal health monitor begins operation from its backup battery which should be fully charged. In this way, it can be readily determined that the personal health monitor unit, including the backup battery, is in good operating condition. After initialization, the personal health monitor can automatically switch on a connection to the AC for the purpose of supplying current for an AC/DC converter that in turn supplies power for the operation of those personal health monitor functions that do not require isolation of the patient from AC. In addition, the personal health monitor can also use the AC for recharging the backup battery. This procedure may automatically take place when the personal health monitor unit is first turned on. However, this may not be suitable in the circumstance when AC is restored after a power outage or after the unit has been disconnected, e.g. if the personal health monitor has been disconnected for a long time, the backup battery may not have sufficient power to start up (boot) the personal computer.

Accordingly, it is an object of the present invention to preserve operation of the personal health monitor in the event of a power outage.

It is another object of the present invention to provide a means wherein an initial connection of AC to a personal health monitor can be differentiated from a reconnection to AC.

It is a further object to allow operation of the personal health monitor in the event of a power outage of a duration greater than 1-2 hours.

It is another object to reduce requirements on a battery in a personal health monitor during power outages.

It is still another object to preserve operations necessary to restart the personal health monitor system during extended periods of power outages.

It is yet still another object to provide for a staged reduction in power requirements in the event that the battery is called on the operate the personal health monitor system for an extended period of time without recharging.

It is still yet another object to conserve battery power so that minimal essential operations and data can be maintained in a personal health monitor.

It is still yet another object of the invention to prevent damage to a rechargeable battery in a personal health monitor.

It is another object of the present invention to provide a device and method for isolation of a personal health monitor from AC by both software control and hardware control.

SUMMARY OF THE INVENTION

The present invention provides for a method of and system for maintaining a reliable power supply for a personal health monitor that operates on power provided by a first power source or a second power source and that includes an isolation relay that disconnects the personal health monitor from the first power source in the absence of a supply of power. A controller provides that the personal health monitor is started from the second power source and thereafter connected to the first power source and operated for a first set of one or more activities, disconnected from the first power source and operated from the second power source for a second set of one or more activities, and, upon the condition of a disruption of the first power source, one or more components of the personal health monitor are disconnected from the second power source, and the isolation relay is supported by the second power source to enable the personal health monitor to be restarted from the first power source if the first power source is restored.

BRIEF DESCRIPTION OF THE DRAWINGS

FIG. 2 is a graph depicting the backup battery voltage over time in the event of disconnection of the personal health monitor from AC with the embodiment of FIG. 1.

FIG. 4 is a flowchart setting forth the steps of the initialization routine run on the computer component of the personal health monitor of FIG. 1 when the computer is turned on.

DESCRIPTION OF THE PREFERRED EMBODIMENTS

Figure 1:
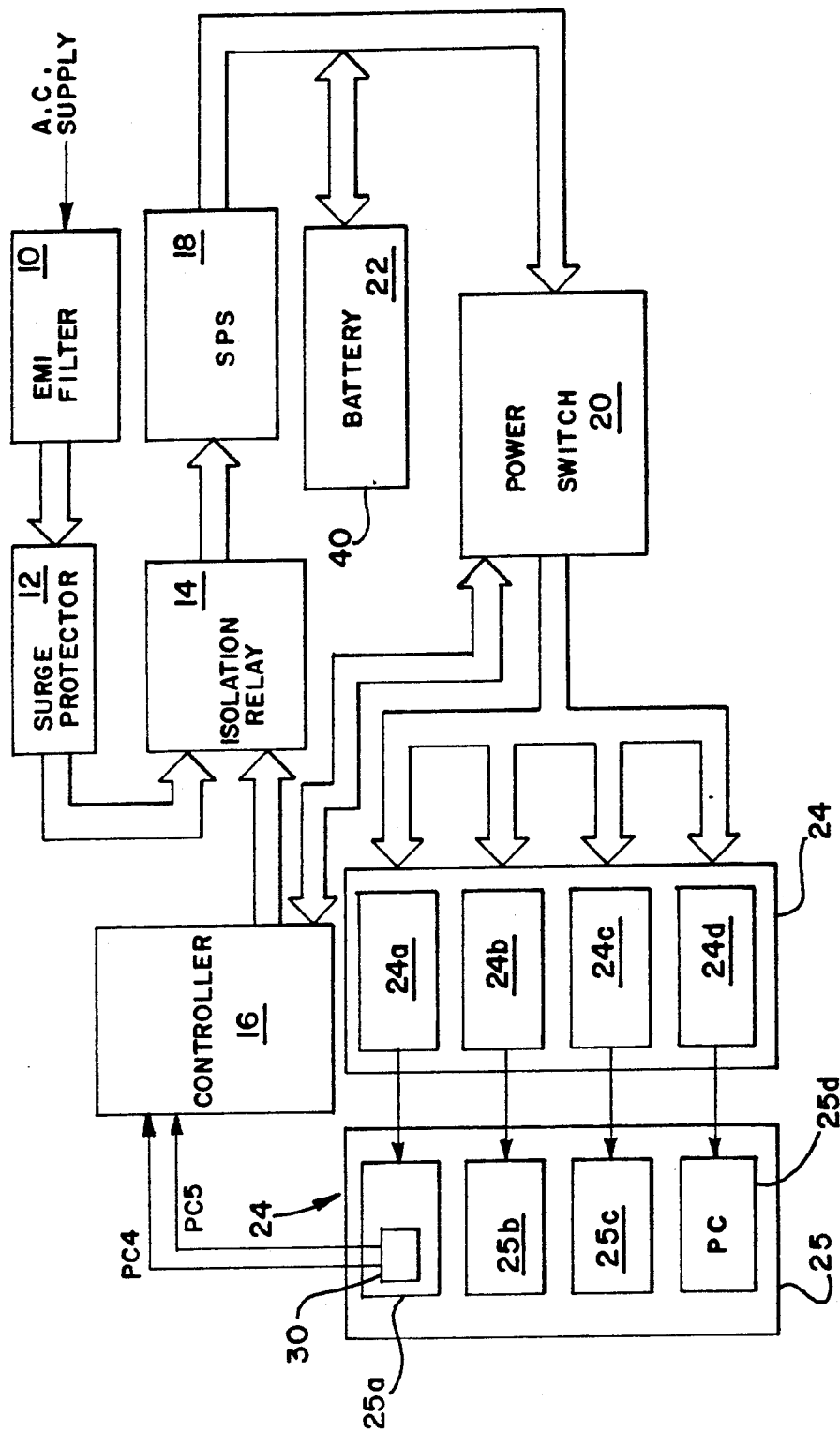
FIG. 1 is a block diagram depicting the present invention used with a personal health monitor.

Referring to FIG. 1, there is depicted a block diagram of presently preferred embodiment of the power supply circuit for the personal health monitor. The personal health monitor is connected to a supply of ordinary house current which is typically 120 volt alternating current (also referred to herein and in the drawings as AC or the first power supply). The AC passes through an EMI (electromagnetic interference) filter 10 and surge protector 12 to provide protection for the personal health monitor from typical problems with ordinary house current supply. EMI filter 10 may be a commercially available unit such as the Corcom brand 6EH9 EMI/RFI model. It has a maximum leakage current less than 100 microamperes. The surge protector 12 may be a metal oxide varistor used to protect the local circuits against high transient voltage spikes.

An isolation relay 14 operates under the direction of the controller 16. The isolation relay 14 is a printed circuit board mounted solid state optoelectric AC relay that can turn on or off the AC line with an optical method. Isolation relay 14 is controlled by a 3–32 VDC logic input. Isolation relay 14 is provided so that the personal health monitor can isolate itself from the AC during certain patient testing to reduce the potential risk of an accident to the patient.

A switching power supply (SPS) 18 is coupled to the isolation relay 14. The SPS 18 is a switching mode power supply that converts the AC to DC delivering 8.6 volts DC. SPS 18 sends the DC to both a power switch 20 and a rechargeable backup battery 22. (Backup battery 22 is also referred to herein as the second power supply). The SPS 18 is power rated at 30 watts and provides 1–4 amps continuous loading capability.

During normal operation, the DC from the SPS 18 is provided to one or more DC/DC converters 24 that provide power to the various components 25 of the personal health monitor. In the preferred embodiment, there are four DC/DC converters: Converter 24a is a +5 volt DC regulator that supplies power to the A/D interface board 25a. Converter 24b and converter 24c are +12 volt and −12 volt DC/DC convertors, respectively, used to power the A/D converter circuits (25b and 25c) and also are used to support sensor measuring circuits such as weight scale, temperature, and ECG. Converter 24d is a ±14.5 DC/DC converter that is used to provide power for the laptop computer (PC) 25d.

Power switch 20 includes one or more toggle switches, fuses and posts. Power switch 20 is used to turn on the personal health monitor initially. This would normally be done by a nurse or other trained person. Switch 20 can also be used for convenience in maintenance. Switch 20 is also connected to the controller 16 to shutdown the personal health monitor to conserve backup battery power, as explained further below.

In the preferred embodiment, the rechargeable backup battery 22 is a 6 volt maintenance free, sealed gelled lead-acid battery. Rechargeable backup battery 22 should have a high recovery capability. During the time that the AC supply is active, rechargeable backup battery 22 receives power from SPS 18 and is therefore constantly being recharged. Rechargeable backup battery 22 is used to provide DC for the personal health monitor in certain circumstances, as set forth below.

During normal operation of the personal health monitor, there are certain test procedures during which the AC is disconnected to reduce the risk of accidentally providing an electric shock to the patient. One example of such a procedure is an ECG test. Accordingly, during the ECG test, the controller 16 will signal the isolation relay 14 to disconnect the personal health monitor from the AC. This is performed under control of the software program run on the personal computer 25d. Personal computer 25d will signal the A/D interface board 25a to in turn signal the controller 16 via inputs PC4 and PC5. Controller 16 will then open the isolation relay 14. When the isolation relay 14 is open, the AC is disconnected from SPS 18. After the ECG testing is finished, the controller 16 again under direction from the program on the personal computer 25d, will signal the isolation relay 14 to close thereby reestablishing the connection of AC to the SPS 18.

When the AC power is disrupted, the rechargeable backup battery 22 can provide DC to enable continued operation of the personal health monitor. The rechargeable backup battery 22 can continue operation of personal health monitor during temporary power outages, for example, or if the personal health monitor is temporarily disconnected from the house current by accident or in case the patient moves the personal health monitor to another location. Due to the power demands of the personal computer 25d and the other equipment, a fully charged backup battery may only continue operation of the personal health monitor for approximately two hours. Accordingly, the controller 16 will allow the rechargeable backup battery 22 to continue to operate the personal health monitor with all functions in operation until the battery discharges to a certain level. If AC is still not restored by that time, the controller 16 will shut off the supply of DC to most of the personal health monitor. However, after that time, the rechargeable battery 22 continues to power the controller 16 and the controller 16, in turn, powers the isolation relay 14. If AC is restored, the personal health monitor can be restarted automatically.

Referring to FIG. 2, there is a graph depicting the DC battery discharge characteristics in the event of a discontinuation of the AC supply. Prior to time T1 the personal health monitor is being supplied with AC and the backup battery is fully charged to 7.8 volts. At T1 the AC supply to the personal health monitor is cut off. The voltage drops down due to an approximate 3.0 amp loading At this period of time, the personal health monitor is still fully functional and operates on power supplied by its rechargeable backup battery. The battery can continue to operate the personal health monitor in this manner for approximately 2 hours. If AC is not restored and the discharge curve reaches T2 (corresponding to 5.7 v), the personal health monitor will provide an alarm to alert the user of the power failure At this point, the normal operation of the personal health monitor will continue until the battery discharges to T3. Prior to reaching T3 (at about 5.5 v), a second alarm signal is provided to indicate that normal operation of the personal health monitor will soon cease. This would occur in about 20 minutes. At T3, controller 16 disconnects most of the components of the personal health monitor, including the personal computer, from the battery to conserve the battery. No patient testing can take place. After T3, only the controller (and through it the isolation relay) are supplied with power by the battery. Further discharge occurs very slowly. In this state, the battery may supply the controller for more than 48 hours.

Figure 3:
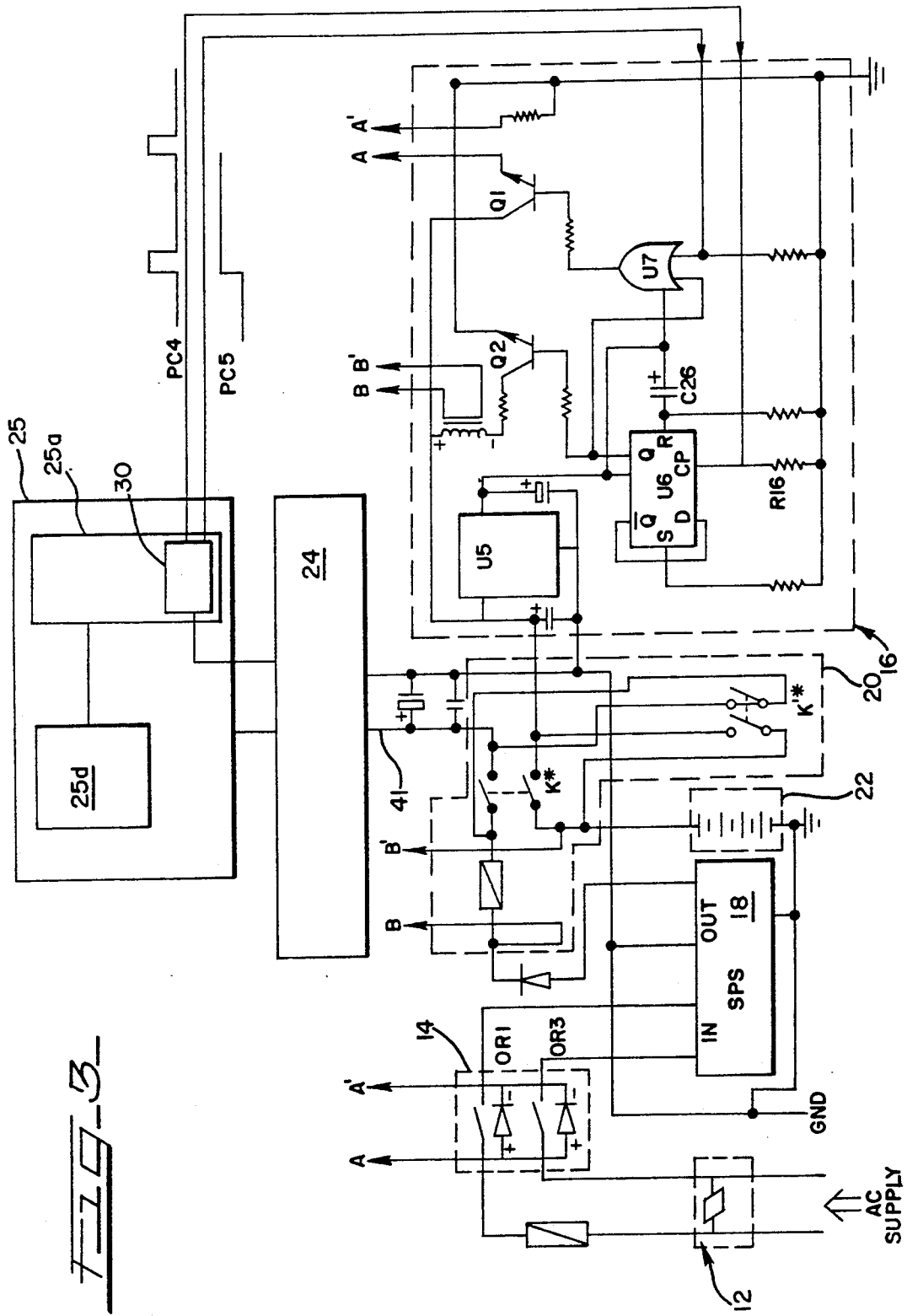
FIG. 3 is a schematic diagram of some of the components corresponding to FIG. 1.

FIG. 3 depicts some of the circuits and components corresponding to the block diagram of FIG. 1. When the personal health monitor is initially turned on, the controller 16 is reset. Output Q of U6 is reset to low ('0') by R17 and C26. The output Q forces transistor Q2 off, whose load, relay OR2 stays in the normally closed state Accordingly, the controller 16 establishes that the personal health monitor is started from battery 22. After the personal health monitor is started and the personal computer has booted and is running, a control program run on the personal computer 25d causes the isolation relay 14 (OR1 and OR3) to close (turn ON) by a high signal at PC5 from the A/D interface 25a to the controller 16. Thereafter, based upon the need to isolate the patient for certain tests, the personal computer 25d can convey a signal to the controller 16 via A/D interface 25a and signals PC4 and PC5 to open isolation relay 14. PC4 is a pulse signal and PC5 is level signal. Both these signals come from the A/D interface board 25a. If the isolation relay 14 is open for the taking of tests such as an ECG test, the battery 22 automatically takes over the power supply requirements.

The operation of the personal health monitor in the event of a disconnection of AC is set forth below. The operating voltage of the personal health monitor is measured by a voltage detector 30. Voltage detector 30 is located on the A/D interface 25a. Voltage detector 30 obtains the voltage level of the personal health monitor directly through a connection to the outputs of the SPS 18 and the battery 22 through converter 24. The output of voltage detector 30 goes to the A/D interface 25a where the voltage reading is converted to data to be handled by the personal computer 25d. If the voltage of battery 22 drops to or below 5.4 volts, a control program running on the personal computer 25d will cause the A/D interface 25A to send a pulse (PC4) to trigger U6 on controller 16 to the '1' state. The result causes Q2 to be ON and the power from the battery 22 to be shut off at B—B' of power switch 20. This shuts off the power for the converters 24 and thus effectively turns off most of the personal health monitor.

Controller 16 continues to receive power from the battery 22 after the time that the other components are shut off (after T3). The controller 16 receives power from battery 22 via low dropout regulator U5. At the same time, the output Q on U6 of controller 16 keeps Q1 ON via OR gate U7. This supplies power at the connection (A—A' in FIG. 3) between controller 16 and the isolation relay 14. Therefore, isolation relay 14 (OR1 and OR3) is maintained in the ON state. Thus, if AC is restored, the personal health monitor can be restarted by power from the AC (through SPS 18). Based on the battery rating and the components used, at least 48 hours can be obtained. When power is restored to the personal computer 25d, it reboots and runs a control routine instructing the A/D interface 25a to send another pulse at PC4 to toggle U6 of controller 16 back to its original state, (i.e. Q=0).

FIG. 4 shows a flow chart of the initial control program run on the personal computer 25d upon connection to power. The control program obtains its data from voltage detector 30 through A/D interface 25a. Voltage detector 30 and A/D interface 25a fetches the voltage reading of the power of the personal health monitor at the outputs of battery 22 and SPS 18. In the preferred embodiment, this reading is obtained every 15 seconds. The control program run on the personal computer 25d compares this reading with a pre-establihed value. If the voltage is lower than 5.7 V, alarms are issued. These may include a flashing red LED, accompanied by audible beep sounds This is the first alarm stage. A message shown on the display screen of the personal health monitor indicates that an action should be taken to restore AC. The alarm signal may sound continuously and repeatedly until the battery drops to 5.5 VDC. The next message displayed on the display screen at this point indicates that the system will soon disconnect power in order to protect the battery. At the same time, visible and audible alarm signals may still be active. If the battery voltage is down to 5.4 VDC the system writes a flag file (named, e.g., bc__flag) on a diskette in the personal computer to indicate that this is not a normal shut down before main power is turned off. Immediately after this step, the controller 16 shuts down the supply of power from the battery 22 to most of the components of the personal health monitor.

Referring still to FIG. 4, when the AC comes back on, the system auto-reboots and checks for the file (bc__flag). If this file does not exist on the diskette, the booting is considered a normal 'power on'. The program jumps to the main segment. In contrast, if the file does exist, it shows that the AC power did fail on the previous occasion and the program erases the file (bc__flag). Then the program on the personal computer 25d instructs the A/D interface 25a to send a pulse signal (PC4) to toggle U6 of controller 16 back to its initial state.

As set forth above, the present invention provides a safe power supply for the personal health monitor through the use of the isolation relay. In addition, the present invention utilizes an inherent feature of the isolation relay, i.e. the alternate power supply (battery) to enhance the reliability of the personal health monitor by using the battery as a backup power supply as well. Further, in order to augment the usefulness of the backup battery, the present invention provides a means that shuts down part of the personal health monitor to conserve the battery power yet maintain those features of the personal health monitor essential to monitor for restoration of normal power. In this way the present invention maintains the high degree of safety afforded by the isolation relay yet can also provide a means to extend the life of the backup battery power supply from approximately 2 hours to as long as 48 hours.

It is intended that the foregoing detailed description be regarded as illustrative rather than limiting, and that it be understood that it is the following claims, including all equivalents, which are intended to define the scope of the invention.

We claim:

1. In a method of operation for a personal health monitor that operates on power provided by a first power source or a second power source and further that includes an isolation relay that disconnects the personal health monitor from the first power source in the absence of a supply of power, the method of operation comprising the steps of:

starting the personal health monitor from a second power source, connecting the personal health monitor to the first power source and operating the personal health monitor from the first power source for a first set of one or more activities, disconnecting the personal health monitor from the first power source and operating the personal health monitor from the second power source for a second set of one or more activities, and upon the condition of a disruption of the first power source to the personal health monitor, disconnecting one or more components of the personal health monitor from the second power source, and maintaining a supply of power to the isolation relay from the second power source to close the isolation relay whereby the personal health monitor can be restarted from the first power source upon the condition that the first power source is restored.

2. The method of claim 1 in which the first power supply is house current.

3. The method of claim 1 in which the second power source is a backup battery power.

4. The method of claim 1 further including the step of:
upon the condition of a disruption of the first power source, connecting one or more components of the personal health monitor to the second power source and operating the personal health monitor for either the first set of one or more activities or the second set of one or more activities if the second power source is above a minimum operation level, and further in which the step of disconnecting one or more components of the personal health monitor from the second power source is further characterized by:
disconnecting one or more components of the personal health monitor from the second power source upon the condition that the second power source is below a minimum operation level.

5. The method of claim 1 further including the step of:
charging the second power source with the first power source.

6. The method of claim 4 further comprising the step of:
storing data in the personal health monitor indicating that one or more components of the personal health monitor will be disconnected from the second power source before the step of disconnecting one or more components of the personal health monitor from the second power source upon the condition that the second power source is below a minimum operation level.

7. The method of claim 4 in which the minimum operation level is 5.4 volts.

8. The method of claim 5 further comprising the step of:
signalling a first alarm upon the condition that the second power source is at or below a first alarm level.

9. The method of claim 8 in which the first alarm level is 5.7 volts.

10. The method of claim 8 further comprising the step of:
signalling a second alarm upon the condition that the second power source is at or below a second alarm level.

11. The method of claim 10 in which the second level is 5.5 volts.

12. The method of claim 6 further comprising the step of:
upon the condition that the personal health monitor is restarted from the second power source,
determining whether data was stored in the personal health monitor indicating that one or more components of the personal health monitor were disconnected from the second power source.

13. A method of operation for a personal health monitor having an isolation relay requiring the supply of power upon the condition that the supply of a first power source is disconnected, the method comprising the steps of:
operating the personal health monitor with a second power source, and,
upon the condition that the voltage level is at or below a minimum operation level,
storing information on the personal health monitor indicating that the supply of power from the second power source to one or more components of the personal health monitor will be disconnected,
disconnecting the supply of power from the second power source to one or more components of the personal health monitor, and
maintaining the isolation relay closed by providing the isolation relay with a supply of power from the second power source,
whereby the isolation relay can remain closed and the personal health monitor can be restarted from the first power source if the first power source is restored.

14. The method of claim 13 further comprising the step of:
upon the condition that first power source is reconnected to the personal health monitor after the supply of power from the second power source to one or more components of the personal health monitor has been connected,
permitting the one or more components of the personal health monitor that had been disconnected to receive power from the first power source.

15. The method of claim 14 further comprising the step of:
modifying the information stored on the personal health monitor to indicate that the one or more components of the personal health monitor that had been disconnected have received power from the first power source.

16. The method of claim 15 in which said step of storing information on the personal health monitor indicating that the supply of power from the second power source to one or components of the personal health monitor will be disconnected comprises the step of:
writing a file on a data storage device with a personal computer.

17. The method of claim 16 in which said step of modifying the information stored on the personal health monitor comprises the step of:
erasing the file.

18. In a personal health monitor of the type that utilizes a first power source and further in which the personal health monitor includes:
one or more components for the measurement of one or more clinical parameters of a patient,
a rechargeable backup battery power source adapted to provide power to the one or more components of the personal health monitor upon the condition that the first power source is disconnected or fails,
an isolation relay coupled to the first power source, the isolation relay adapted to disconnect the personal health monitor from the first power source in the absence of a supply of power to the isolation relay,
a voltage detector responsive to the output of the rechargeable backup battery power source, and
a power switch coupled between the outputs of the first power source and the rechargeable backup battery power source and the one or more components of the personal health monitor, a controller for preserving operation of the personal health monitor, said controller coupled to the rechargeable battery backup power source, the power switch, the voltage detector and the isolation relay, and further in which said controller comprises:

means for opening the power switch to disconnect the rechargeable backup battery power source from the components of the personal health monitor upon detection by the voltage detector of a voltage at or below a minimum operation level, means for supplying power to the isolation relay to enable the isolation relay to remain closed, whereby the personal health monitor can be restarted from the first power source.

19. The controller of claim 18 further comprising:

means for closing the power switch upon initially turning on the personal health monitor to connect the rechargeable backup battery power source to the one or more components of the personal health monitor whereby one or more components of the personal health monitor can be started from the rechargeable backup battery power source.

20. A system for providing an uninterruptible power source for a personal health monitor of the type that utilizes a first power source and further in which the personal health monitor includes one or more components for the measurement of one or more clinical parameters of a patient, the system comprising:

a rechargeable backup battery power source adapted to provide power to the one or more components of the personal health monitor upon the condition that the first power source is disconnected or fails, an isolation relay coupled to the first power source, said isolation relay adapted to disconnect the personal health monitor from the first power source in the absence of a supply of power to the isolation relay, a voltage detector responsive to the output of said rechargeable backup battery power source, a power switch coupled between the first power source, the output of said rechargeable backup battery power source and the one or more components of the personal health monitor, and a controller coupled to said rechargeable battery backup power source, said power switch, said voltage detector and said isolation relay, said controller comprising:

means for opening said power switch to disconnect said rechargeable backup battery power source from the components of the personal health monitor upon the detection by said voltage detector of a voltage at or below a minimum operation level, means for supplying power to said isolation relay to enable said isolation relay to remain closed, whereby the personal health monitor can be restarted from the first power source.

21. The device of claim 20 in which the one or more components of the personal health monitor include a personal computer responsive to said voltage detector and further in which the device further comprises:

a routine capable of running on the personal computer, said routine comprising:

means for for comparing the voltage measured by said voltage detector to a one or more operating levels, means for signalling an alarm upon the condition the voltage measured by voltage detector is at or below an alarm level means for storing data in a storage medium indicating that one or more components of the personal health monitor will be shut off, means for signalling said controller to open said power switch to disconnect said rechargeable backup battery power source from the components of the personal health monitor.

22. The device of claim 21 further comprising:

a control routine capable of running on the personal computer, said control routine comprising:

means for identifying whether data has been stored in a storage medium indicating that one or more components of the personal health monitor had been shut off, means for modifying data stored in a storage medium indicating that one or more components if the personal health monitor had been shut off, and means for resetting said controller.

* * * * *

UNITED STATES PATENT AND TRADEMARK OFFICE
CERTIFICATE OF CORRECTION

PATENT NO. : 5,128,552
DATED : July 7, 1992
INVENTOR(S) : WILLIAM FANG et al.

Page 1 of 3

It is certified that error appears in the above-indentified patent and that said Letters Patent is hereby corrected as shown below: Title page, item [56]

IN THE REFERENCES CITED

On the title page, under the heading "U.S. PATENT DOCUMENTS," please add the following U.S. Patent documents:

| | | | |
|---|---|---|---|
| --3,925,772 | 12/1975 | Miller et al. | 307/66 |
| 4,138,670 | 02/1979 | Schneider et al. | 340/507 |
| 4,556,061 | 12/1985 | Barreras et al. | 128/419 PT |
| 4,583,553 | 04/1986 | Shah et al. | 128/704 |
| 4,660,027 | 04/1987 | Davis | 340/636 |
| 4,731,726 | 03/1988 | Allen, III | 364/413.09 |
| 4,803,625 | 02/1989 | Fu et al. | 364/413.03-- |

Column 1, line 30, after "such" please insert --as--.
Column 2, line 28, after "directly" please insert --.--.
Column 2, line 32, after "facility" please insert --.--.
Column 2, line 46, after "provided" please insert --.--.
Column 2, line 60, after "used" please insert --to--.
Column 3, line 24, after "Thus" please insert --,--.
Column 3, line 28, please delete "an" and substitute therefor --a--.
Column 4, line 8, please delete "on the" and substitute therefor --on to--.

UNITED STATES PATENT AND TRADEMARK OFFICE
CERTIFICATE OF CORRECTION

PATENT NO. : 5,128,552
DATED : July 7, 1992
INVENTOR(S) : WILLIAM FANG et al.

It is certified that error appears in the above-indentified patent and that said Letters Patent is hereby corrected as shown below:

Column 5, line 36, please delete "±14.5" and substitute therefor --+14.5--.

Column 6, line 37, after "loading" please insert --.--.

Column 6, line 44, after "failure" please insert --.--.

Column 6, line 65, after "state" please insert --.--.

Column 7, line 1, please delete "run" and substitute therefor --running--.

Column 7, line 53, please delete "and" and substitute therefor --on--.

Column 7, line 58, please delete "pre-establihed" and substitute therefor --pre-established--.

Column 7, line 61, after "sounds" please insert --.--.

Claim 11, line 1, after "second" please insert --alarm--.

Claim 14, line 7, please delete "connected" and substitute therefor --disconnected--.

Claim 16, line 4, after "or" please insert --more--.

Claim 21, line 7, please delete "for".

UNITED STATES PATENT AND TRADEMARK OFFICE
CERTIFICATE OF CORRECTION

PATENT NO. : 5,128,552
DATED : July 7, 1992
INVENTOR(S) : WILLIAM FANG et al.

It is certified that error appears in the above-indentified patent and that said Letters Patent is hereby corrected as shown below:

Col. 12, Claim 21, line 8, please delete "a".
Col. 12, Claim 21, line 12, after "level" please insert --,--.

Signed and Sealed this

Seventeenth Day of May, 1994

Attest:

BRUCE LEHMAN

Attesting Officer      Commissioner of Patents and Trademarks